March 8, 1938.                C. C. FARMER                2,110,702
                            POWER REVERSE GEAR
                            Filed Feb. 19, 1936
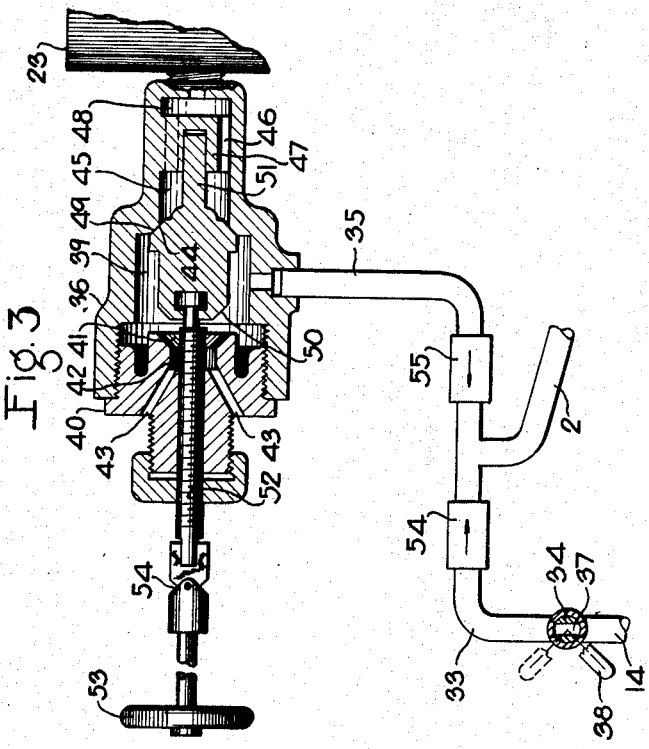
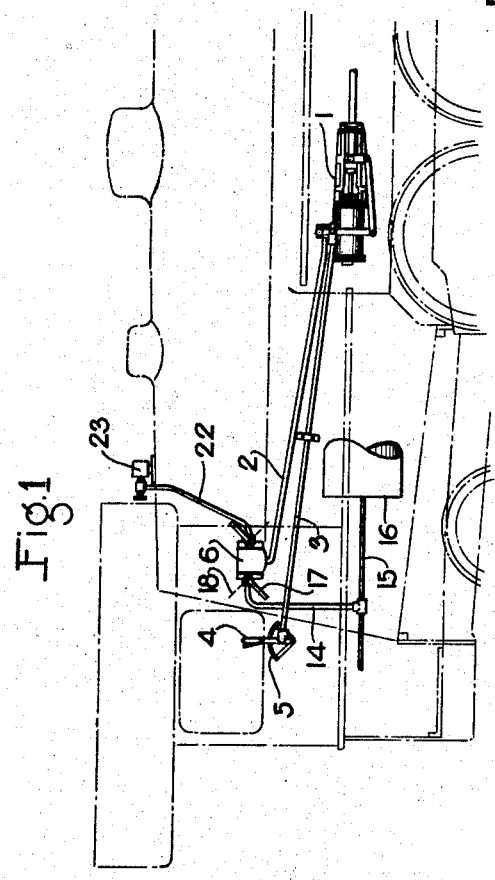
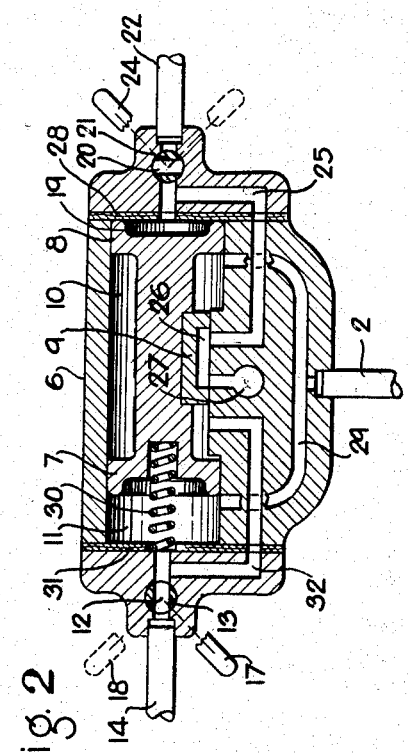
INVENTOR
CLYDE C. FARMER
BY  Wm. M. Cady
ATTORNEY Patented Mar. 8, 1938

2,110,702

UNITED STATES PATENT OFFICE 2,110,702

POWER REVERSE GEAR

Clyde C. Farmer, Pittsburgh, Pa., assignor to The Westinghouse Air Brake Company, Wilmerding, Pa., a corporation of Pennsylvania Application February 19, 1936, Serial No. 64,621

22 Claims. (Cl. 137—139)

This invention relates to power reverse gear for steam locomotives and more particularly to means for controlling the operation thereof.

Certain apparatus on a locomotive, such as the power reverse gear, is adapted to be operated by fluid under pressure preferably in the form of compressed air taken from the main reservoir of the usual fluid pressure brake system, but in case of failure of the supply of compressed air, the power reverse gear is adapted to be operated by steam taken from the steam turret on the locomotive boiler.

Suitable valves are provided for controlling the supply of compressed air and steam for operating the reverse gear, these valves being arranged so that fluid under pressure from one source may be cut off when fluid under pressure from the other source is being employed.

In the systems heretofore employed however, when compressed air is being used for controlling the reverse gear, there is a possibility that, due for instance to a leaking valve or the like, steam pressure in the steam connection to the reverse gear may force steam or water from this connection to the reverse gear and possibly through the compressed air pipes to the main reservoir.

Precautions are taken to reduce the moisture content of the compressed air in the main reservoirs to a minimum in order to avoid difficulties, resulting from water or ice, in air brake apparatus, power reverse gears, and the like which use the compressed air.

It will therefore be evident that it is desirable to prevent steam or water entering the main reservoir and passing therefrom to the apparatus controlled by compressed air, and the principal object of the invention is to provide improved means for controlling the supply of compressed air and steam for operating the power reverse gear or the like on the locomotive, such that steam or water cannot be forced into the main reservoir or conduits communicating therewith.

In the accompanying drawing; Fig. 1 is a phantom, side elevational view of a portion of a locomotive showing a power reverse gear and control means, embodying one form of the invention, superimposed thereon; Fig. 2 is a sectional view of a control valve device shown in Fig. 1; and Fig. 3 is a diagrammatic view, mainly in section, of a modified form of the invention.

As shown in Fig. 1 of the drawing, a power reverse gear 1, of any desired construction, is secured to the side of the locomotive and is connected to a fluid pressure supply pipe 2, and is also connected by a rod 3 to a reversing lever 4 in the cab of the locomotive. The reversing lever 4 is fulcrumed at its lower end and is adapted to be manually moved in either direction from the neutral position shown, relative to a quadrant 5. According to the direction of movement of the lever 4 on the quadrant 5, the power reverse gear 1 is operated by fluid under pressure supplied through pipe 2 to effect operation of mechanism on the locomotive which determines the direction in which the locomotive will travel when motive power is applied. As so far described this apparatus and its operation are well known and since the invention does not reside in the particular construction and operation of such, a more detailed description thereof is not deemed necessary to a comprehensive understanding of the invention.

According to one form of the invention, a valve device 6 is provided for controlling the supply of fluid under pressure to the pipe 2 leading to the reverse gear 1.

The valve device 6 comprises a casing containing two spaced, connected pistons 7 and 8 and a slide valve 9 adapted to be operated by said pistons, said slide valve being disposed in a chamber 10 formed between the pistons.

A chamber 11 is formed at the outer face of piston 7 and is adapted to be connected through a port 12 in a plug valve 13 to a pipe 14 which leads to a pipe 15 connected to the usual main reservoir 16 which is adapted to be supplied with fluid under pressure in the form of compressed air in the usual well known manner. A handle 17 is provided for turning the plug valve 13 from the open position shown in Fig. 2 to a closed position in which the handle 17 will occupy the position indicated by the reference character 18 and the port 12 will be at right angles to the position shown in the drawing. A spring 30 is provided in chamber 11 and acts on the piston 7 urging said piston and the piston 8 and slide valve 9 in a direction toward the right hand.

A chamber 19 is formed at the outer face of the piston 8 and is adapted to be connected through a port 20 in a plug valve 21 to a pipe 22 which is adapted to be supplied with steam from the locomotive boiler through the usual steam turret 23. The plug valve 21 has a closed position as shown in the drawing, and an open position in which the port 20 establishes communication from chamber 19 to pipe 22. A handle 24 is provided for turning said valve to its different positions.

It is preferred to control the operation of the power reverse gear 1 by compressed air drawn from the main reservoir 16 and in order to do so, the plug valve 21 is normally maintained in the closed position so as to cut off the supply of steam from the steam pipe 22 to chamber 19. The plug valve 13 is normally in the open position, as shown in the drawing, in which compressed air from main reservoir 16 is supplied through pipe 14 and port 12 in plug valve 13 to piston chamber 11.

With the pistons 7 and 8 in the position shown in the drawing the chamber 19 is vented to the atmosphere through passage 25, cavity 26 in slide valve 9 and an atmospheric passage 27. This permits the pressure of compressed air in chamber 11 acting on piston 7 to hold the pistons 7 and 8 and slide valve 9 in the position shown in the drawing in which the piston 8 is pressed into sealing engagement with a gasket 28 so as to prevent leakage past the piston 8.

With the pistons 7 and 8 and slide valve 9 conditioned as just described, communication is established from the main reservoir 16 to the power reverse gear 1 through pipe 14, port 12 in plug valve 13, piston chamber 11, passage 29 and pipe 2, so that compressed air from the main reservoir 16 may be used for operation of said power reverse gear. Compressed air supplied to passage 29 also flows to valve chamber 10 and acts on the slide valve 9 to hold said valve seated.

With the device 6 in the operating position just described, it will be noted that if the plug valve 21 leaks so that water or steam may leak or be forced from the steam pipe 22 past said plug valve, such water or steam is vented to the atmosphere through passage 25, cavity 26 in slide valve 9 and the atmospheric passage 27, and since the piston 8 is sealed against gasket 28 and the slide valve 9 is pressed against its seat, water or steam which may be in chamber 19, passage 25 or cavity 26 cannot gain access to the chambers or passages containing compressed air and therefore cannot enter the main reservoir 16.

If for any reason, such as failure of the supply of compressed air, it is desired to use steam for operating the power reverse gear 1, the plug valve 13 is closed and the plug valve 21 opened. Steam then flows from pipe 22 to piston chamber 19 and acts on the piston 8 which moves said piston and thereby the piston 7 and slide valve 9 from the position shown in the drawing to a position defined by engagement of the piston 7 with a gasket 31. In case it is desired to use steam for the power reverse gear at a time when there might be compressed air in chamber 11, the above described shifting of parts is ensured, since the steam pressure employed on the locomotive and supplied to chamber 19 sufficiently exceeds the air pressure carried in the main reservoir 16 and which might be acting in chamber 11 at the time the plug valve 21 was opened.

As the pistons 7 and 8 move to their left hand position, said pistons move over the passage 29 so that the right hand end of the passage is connected to chamber 19 and the left hand end is opened to valve chamber 10. Steam then flows from chamber 19 to passage 29 and from thence to pipe 2 leading to the power reverse gear 1 so that said gear may be operated by steam. Steam also flows from passage 29 to valve chamber 10 and acts to seat the slide valve 9.

The movement of the pistons 7 and 8 to the left hand position shifts the slide valve 9 to a position in which cavity 26 therein connects passage 32 to the atmospheric passage 27 and since passage 32 is connected to the piston chamber 11, said chamber is consequently vented.

With the parts of the device in this left hand or reverse position the piston 7 seals against gasket 31 so that there can be no leakage of steam or water past said piston to chamber 11, and since the slide valve 9 prevents leakage of steam or water from chamber 10 or passage 25 to passage 32, steam or water can not leak or otherwise gain access to the air pipe 14 and thus the main reservoir 16.

When it is desired to cut off the supply of steam to pipe 2 and again supply compressed air to said pipe for use in operation of the power reverse gear, the plug valve 21 is turned to its closed position, and the plug valve 13 is turned to its open position, as shown in the drawing. When the supply of steam is thus cut off from chambers 19 and 10, the steam contained therein promptly condenses, thus reducing the pressure in said chambers sufficiently for the pressure of the compressed air in chamber 11 acting on piston 7 to move the piston 7 away from the gasket 31 following which said piston and the piston 8 and slide valve 9 are promptly shifted back to the position shown in the drawing in which compressed air is supplied to pipe 2 and the steam chamber 19 is vented to the atmosphere through cavity 26 in slide valve 9 and the atmospheric passage 27.

The spring 30 acting on the piston 7 aids the pressure of air in chamber 11 to move the pistons 7 and 8 and slide valve 9 to the position shown in the drawing when the supply of steam is cut off to chamber 19 and the supply of compressed air is opened to chamber 11. Although the spring is not essential to this reversing operation, it will be noted that more prompt reversal of the parts will be secured by its use since such reversal will occur upon a less reduction in pressure in chamber 19, due to condensation of steam, than would otherwise be necessary.

The spring 30 also serves another useful purpose in that it positions the pistons 7 and 8 and slide valve 9 so that there will be no loss of compressed air through the atmospheric passage 27 in case the plug valve 13 is open when a locomotive is being prepared for service and the main reservoir 16 is consequently being charged with fluid under pressure. Without the spring 30 such loss of compressed air might occur since with a locomotive dead the pistons 7 and 8 and slide valve 9 would be free to shift and might occupy their left hand position at the time the main reservoir 16 was being initially charged and would therefore permit loss of compressed air until sufficient pressure was built up in chamber 11 to shift the pistons and slide valve 9 to their right hand position so as to close communication from passage 32 to passage 27.

According to the modified form of the invention shown in Fig. 3, the pipe 2 through which fluid under pressure is supplied to the power reverse gear 1 is connected through a branch pipe 33 and a plug valve 34 to the compressed air supply pipe 14 and through another branch pipe 35 and a steam valve 36 to the steam supply in turret 23.

The plug valve 34 has an open position as shown in the drawing in which communication is established through a port 37 from pipe 14 to pipe 33, and a closed position in which said communication is closed. A handle 38 is provided for turning the valve 34 to its different positions.

The steam valve 36 comprises a casing secured to the steam turret 23 and having a chamber 39 which is open at one end. The open end of chamber 39 is closed by a cap nut 40 secured to the casing preferably by screw-threaded engagement.

The cap nut 40 is provided on its inner face with an axially arranged valve seat 41 surrounding a cavity 42 which is vented to the atmosphere through one or more small leakage ports 43. In the casing there is provided a valve seat 44 surrounding a cavity 45 which is open through one or more ports 46 in a partition wall 47 to a chamber 48 which is in communication with the steam supply in turret 23.

The valve seats 41 and 44 are spaced apart and are coaxial. A movable element is disposed in chamber 39 and is provided on one end with a valve 49 adapted to engage the seat 44 and on the other end with a valve 50 adapted to engage the seat 41.

The valve element 49, 50 is supported at one end by a stem 51 which is slidably mounted in a suitable bore in the partition wall 47 and at the other end of the valve element 49, 50 is pivotally connected to one end of a spindle 52 which extends through the cap 40 and has screw-threaded engagement therewith. A hand wheel 53 is connected through a universal joint 54 to the outer end of the spindle 52 for turning same and thereby moving the valve element 49, 50 from engagement with seat 41 to engagement with seat 44 and reverse.

In operation, when it is desired to employ compressed air for operating the power reverse gear 1, the plug valve 34 is turned to its open position as shown in the drawing, while in the steam valve the hand wheel 53 is turned to move the valve element 49, 50 until the valve 49 is in engagement with its seat 44 thereby preventing steam supplied chamber 45 from the steam turret 23 from entering the chamber 39.

When the parts are adjusted as just described, compressed air flows from the supply pipe 14 through port 37 in the plug valve 34 to pipe 33 and thence through a check valve 54 and pipe 2 to the power reverse gear 1. A check valve 55 is provided in branch pipe 35 which prevents compressed air supplied to pipe 2 from flowing through pipe 35 to chamber 39 in the steam valve 36 and from thence to the atmosphere past the unseated valve 50 and through the atmospheric ports 43. By reason of the chamber 39 being vented as just described, it will be evident that if there should be leakage of steam or water from the steam supply pipe 22 past the valve 49 into chamber 39 such leakage will be dissipated through the atmospheric ports 43 and thus cannot be forced into or otherwise gain access to the compressed air pipes 33 and 14 and thus enter the main reservoir 16.

If instead of compressed air it is desired to use steam for operating the power reverse gear 1, the plug valve 34 is turned to its closed position and the hand wheel 53 is operated to turn the spindle 52 and pull the valve element 49, 50 away from the seat 49 and into engagement with the seat 41. This operation of the steam valve admits steam from the steam turret 23 to chamber 39 and closes communication from said chamber to the atmospheric ports 43.

Steam thus supplied to chamber 39 flows through pipe 35, check valve 55 and pipe 2 to the power reverse gear 1. The check valve 54 prevents the flow of steam or water to the compressed air pipes 33 and 14 and from thence to the main reservoir 16 in case the plug valve 34 is open at the time the steam valve 36 is operated to supply steam to pipe 2.

It will now be noted that in both forms of the invention steam or water cannot be forced into or otherwise obtain entry into the main reservoir 16 or other parts of the compressed air system on the locomotive.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In combination, a device adapted to be operated by fluid under pressure, valve means operative to control the supply of fluid under pressure from one source to said device, a second valve means operative to control the supply of fluid under pressure from another source to said device, means for preventing flow of fluid under pressure from one valve means to the other, and means included in the preventing means for venting the communication between said second valve means and the preventing means when said second valve means is in the position for cutting off the supply of fluid under pressure to said device.

2. In combination, a device adapted to be operated by fluid under pressure, a first valve means operative to control the supply of fluid under pressure from one source to said device, a second valve means operative to control the supply of fluid under pressure from another source to said device, and means for preventing the flow of fluid under pressure from said first valve means to said second valve means and operative to vent the communication leading to said second valve means.

3. In combination, a device adapted to be operated by fluid under pressure, a first valve means operative to control the supply of fluid under pressure from one source to said device, a second valve means operative to control the supply of fluid under pressure from another source to said device, means movable to a position for preventing flow of fluid under pressure from said first valve means to said second valve means and operative in said position to vent the communication between said second valve means and the preventing means when said second valve means is in the position for cutting off the supply of fluid under pressure to said device and said first valve means is in the position for supplying fluid under pressure to said device.

4. In combination, a device adapted to be operated by fluid under pressure, valve means operative to control the supply of fluid under pressure from one source to said device, other valve means operative to control the supply of fluid under pressure from another source to said device, means for preventing flow of fluid under pressure from one valve means to the other, one of said valve means being operative in the position for cutting off the supply of fluid under pressure to said device to vent the communication leading to the preventing means.

5. In combination, a device adapted to be operated by fluid under pressure supplied from either one source or another source, and valve means for controlling such supply, said valve means comprising a valve operative to either supply fluid under pressure or cut off the supply of fluid under pressure from one source to said device, another valve operative to either supply fluid under pressure or cut off the supply of fluid under pressure from the other source to said device, and means for preventing fluid under pressure supplied by one valve from acting on the other valve, the preventing means including means for venting the communication between one valve and the preventing means when such valve is in the position for cutting off the supply of fluid under pressure to said device.

6. In combination, a device adapted to be operated by fluid under pressure supplied from either one source or another source, a valve operative to either supply fluid under pressure or cut off the supply of fluid under pressure from one source to said device, another valve operative to either supply fluid under pressure or cut off the supply of fluid under pressure from the other source to said valve device, means for preventing flow of fluid under pressure supplied by one valve to the other valve, one of said valves being operative in the position for cutting off the supply of fluid under pressure to said device to vent the communication leading therefrom to the preventing means.

7. In combination, a device adapted to be operated by fluid under pressure supplied from either one source or another source, a valve operative to either supply fluid under pressure or cut off the supply of fluid under pressure from one source to said device, another valve operative to either supply fluid under pressure or cut off the supply of fluid under pressure from the other source to said valve device, means for preventing flow of fluid under pressure supplied by one valve to the other valve, and means operated by fluid under pressure supplied by one valve when the other valve is in the position for cutting off the supply of fluid under pressure to said device for venting the communication leading to said other valve.

8. In combination, a device adapted to be operated by fluid under pressure supplied from either one source or another source, a valve operative to either supply fluid under pressure or cut off the supply of fluid under pressure from one source to said device, another valve operative to either supply fluid under pressure or cut off the supply of fluid under pressure from the other source to said valve device, means for preventing flow of fluid under pressure supplied by one valve to the other valve, and means operated by fluid under pressure supplied by one valve when the other valve is in the position for cutting off the supply of fluid under pressure to said device for establishing communication from said one valve to said device and for venting the communication leading to said other valve.

9. In combination, a device adapted to be operated by fluid under pressure supplied from either one source or another source, a valve operative to either supply fluid under pressure or cut off the supply of fluid under pressure from one source to said device, another valve operative to either supply fluid under pressure or cut off the supply of fluid under pressure from the other source to said valve device, means for preventing flow of fluid under pressure supplied by one valve to the other valve, and means operated by fluid under pressure supplied by one valve when the other valve is in the position for cutting off the supply of fluid under pressure to said device for closing communication from said other valve to said device and for venting said communication.

10. In combination, a device adapted to be operated by fluid under pressure supplied from either one source or another source, a valve operative to either supply fluid under pressure or cut off the supply of fluid under pressure from one source to said device, another valve operative to either supply fluid under pressure or cut off the supply of fluid under pressure from the other source to said valve device, means for preventing flow of fluid under pressure supplied by one valve to the other valve, and a valve device for controlling communication from both of said valves to said device and having one position for closing communication from one of said valves to said device and for venting such communication and having another position for closing communication from the other of said valves to said device and for venting such communication.

11. In combination, a device adapted to be operated by fluid under pressure supplied from either one source or another source, a valve operative to either supply fluid under pressure or cut off the supply of fluid under pressure from one source to said device, another valve operative to either supply fluid under pressure or cut off the supply of fluid under pressure from the other source to said valve device, means for preventing flow of fluid under pressure supplied by one valve to the other valve, a valve device for controlling communication from both of said valves to said device and having one position for closing communication from one of said valves to said device and for venting such communication and having another position for closing communication from the other of said valves to said device and for venting such communication, and means actuated by fluid under pressure supplied by one of said valves when the other valve is in the position for cutting off the supply of fluid under pressure to said device for operating said valve device.

12. In combination, a device adapted to be operated by fluid under pressure supplied to a pipe, a manually operated valve for controlling the supply of fluid under pressure from one source to said pipe and having a position for cutting off such supply, another manually operated valve for controlling the supply of fluid under pressure from another source to said pipe and having a position for cutting off such supply, a check valve in the communication between one of said manually operated valves and said pipe, another check valve in the communication between the other manually operated valve and said pipe, one of said manually operated valves being operative in the cut-off position to vent the communication leading to the check valve therein.

13. In combination, a device adapted to be operated by fluid under pressure supplied to a pipe, a manually operated valve for controlling the supply of fluid under pressure from one source to said pipe and having a position for cutting off such supply, another manually operated valve for controlling the supply of fluid under pressure from another source to said pipe and having a position for cutting off such supply and for venting the outlet communication connected thereto, a check valve in the communication between the first mentioned manually operated valve and said pipe, and another check valve in the communication between the second mentioned manually operated valve and said pipe.

14. In combination, a device adapted to be operated by fluid under pressure supplied to a pipe, a manually operated valve for controlling the supply of fluid under pressure from one source to said pipe and having a position for cutting off such supply, another manually operated valve for controlling the supply of fluid under pressure from another source to said pipe and having a position for cutting off such supply, a valve having one position for establishing communication from one manually operated valve to said pipe and for venting the communication leading to the other manually operated valve and having another position for reversing said communication, and means operated by fluid under pressure supplied by one or the other of said manually operated valves for positioning said valve.

15. In combination, a device adapted to be operated by fluid under pressure supplied to a pipe, a main reservoir adapted to be charged with compressed air, and a source of steam pressure, a manually operated valve having one position for supplying compressed air from said main reservoir to said device and another position for cutting off such supply, a manually operated steam valve comprising a casing and a double ended valve mounted therein movable to one position for supplying steam from said source of steam pressure to said device and movable to another position for cutting off the supply of steam to said device and for venting the communication supplied with steam in the first mentioned position, and check valve means interposed in the communications between the manually operated valves and said pipe for preventing flow of fluid under pressure supplied by one manually operated valve to the other manually operated valve.

16. In combination, a controlling device adapted to be operated by fluid under pressure, two sources of fluid under pressure, and a valve device movable to a position to connect one source of fluid under pressure to said controlling device and to connect with the atmosphere a communication through which fluid under pressure is supplied from the other source of fluid under pressure to said valve device.

17. In combination, a controlling device adapted to be operated by fluid under pressure, two sources of fluid under pressure, one of which is steam and the other compressed air, and a valve device movable to a position to connect one source of fluid under pressure to said controlling device and to connect with the atmosphere a communication through which fluid under pressure is supplied from the other source of fluid under pressure to said valve device.

18. In combination, a controlling device adapted to be operated by fluid under pressure, two sources of fluid under pressure, a valve device operated by fluid under pressure supplied from one source to establish communication from said source to said controlling device and to connect to the atmosphere a communication through which fluid under pressure is supplied from the other source to said valve device, and manually operable valve means for controlling communication from one source to said valve device.

19. In combination, a controlling device adapted to be operated by fluid under pressure, two sources of fluid under pressure, a valve device operated by fluid under pressure supplied from either one source or the other to establish communication from one source to said controlling device and to connect a communication leading to the other source with the atmosphere, and manually operable valve means for controlling communication from each source to said valve device.

20. In combination, a device adapted to be normally operated by compressed air supplied through a communication to a pipe leading to said device and adapted upon failure of the supply of compressed air to be operated by steam pressure adapted to be supplied through a different communication to said pipe, means for preventing the flow of compressed air to the second mentioned communication and for preventing the flow of steam to the first mentioned communication, and manually controlled valve means operative to cut off the supply of steam to the second mentioned communication and to vent same.

21. In combination, a device adapted to be normally operated by compressed air supplied through a communication to a pipe leading to said device and adapted upon failure of the supply of compressed air to be operated by steam pressure adapted to be supplied through a different communication to said pipe, means for preventing the flow of compressed air to the second mentioned communication and for preventing the flow of steam to the first mentioned communication, manually controlled valve means operative to cut off the supply of steam to the second mentioned communication, and means operative upon the operation of said valve means to cut off the supply of steam to the second mentioned communication to vent same.

22. In combination, a device adapted to be normally operated by compressed air supplied through a communication to a pipe leading to said device and adapted upon failure of the supply of compressed air to be operated by steam pressure adapted to be supplied through a different communication to said pipe, means for preventing the flow of compressed air to the second mentioned communication and for preventing the flow of steam to the first mentioned communication, manually controlled valve means operative to cut off the supply of compressed air to the first mentioned communication, and other manually controlled valve means operative to cut off the supply of steam to the second mentioned communication and to vent same.

CLYDE C. FARMER.